United States Patent
Katou

(10) Patent No.: US 7,398,584 B2
(45) Date of Patent: Jul. 15, 2008

(54) PRESS FITTING TOOL

(75) Inventor: Tsutomu Katou, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 161 days.

(21) Appl. No.: 11/270,539

(22) Filed: Nov. 10, 2005

(65) Prior Publication Data

US 2006/0099861 A1     May 11, 2006

(30) Foreign Application Priority Data

Nov. 11, 2004 (JP) .............................. 2004-328093

(51) Int. Cl.
*B23P 19/04* (2006.01)
(52) U.S. Cl. .................................... 29/252; 29/253
(58) Field of Classification Search .................... 29/252, 29/237, 238, 243.523, 253, 257; 81/434
See application file for complete search history.

(56) References Cited

U.S. PATENT DOCUMENTS 5,584,221 A * 12/1996 Petrantoni ..................... 81/434
5,904,079 A * 5/1999 Tsuge et al. .................. 81/434
5,959,899 A * 9/1999 Sredanovic ............ 365/189.02
6,123,244 A * 9/2000 Huang ......................... 227/119
6,164,170 A * 12/2000 Habermehl et al. ........... 81/434
7,043,808 B2 * 5/2006 Patton .......................... 29/252

FOREIGN PATENT DOCUMENTS

JP        08-071861 A      3/1996

* cited by examiner

*Primary Examiner*—Lee D Wilson
(74) *Attorney, Agent, or Firm*—Foley & Lardner LLP

(57) ABSTRACT

For press fitting a pin member into aligned holes of works, a press fitting tool is provided, which comprises a pin diameter reducing device that reduces at least a leading end of the pin member to a given diameter by applying an external force to the pin member. The given diameter is smaller than that of the aligned holes. The press fitting tool further comprises an actuating device that thrusts the pin member in a direction to insert the diametrically reduced leading end of the pin member into an inlet portion of the aligned holes without inducing abutment of the diametrically reduced leading end of the pin member with a peripheral edge of the inlet portion of the aligned holes.

14 Claims, 4 Drawing Sheets

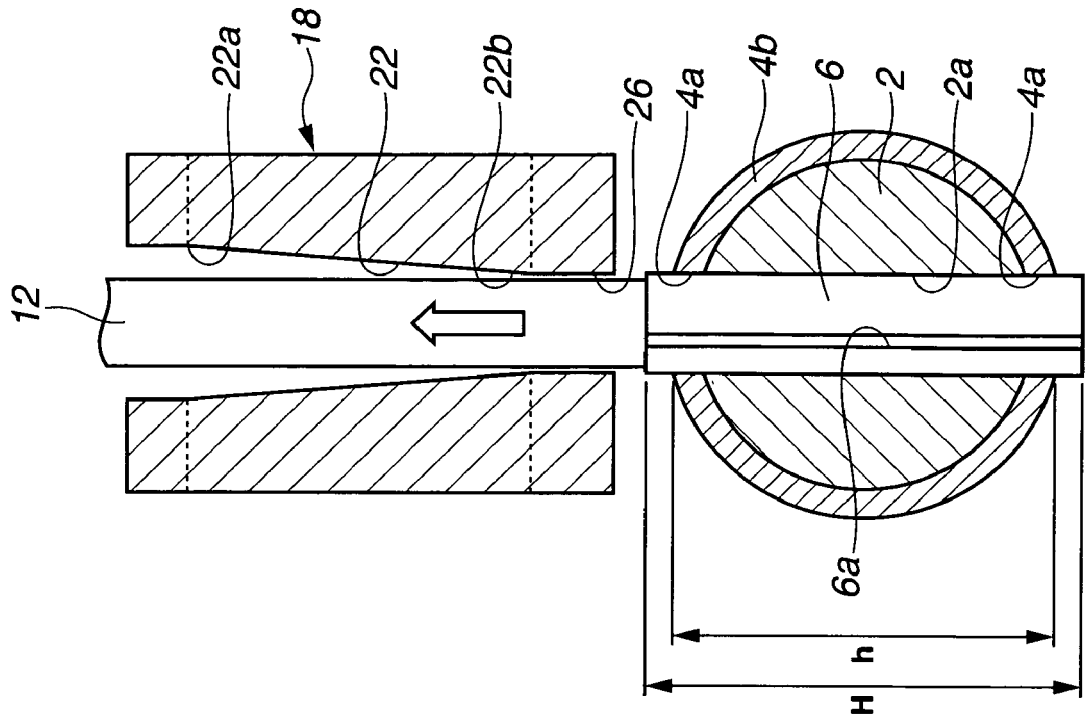
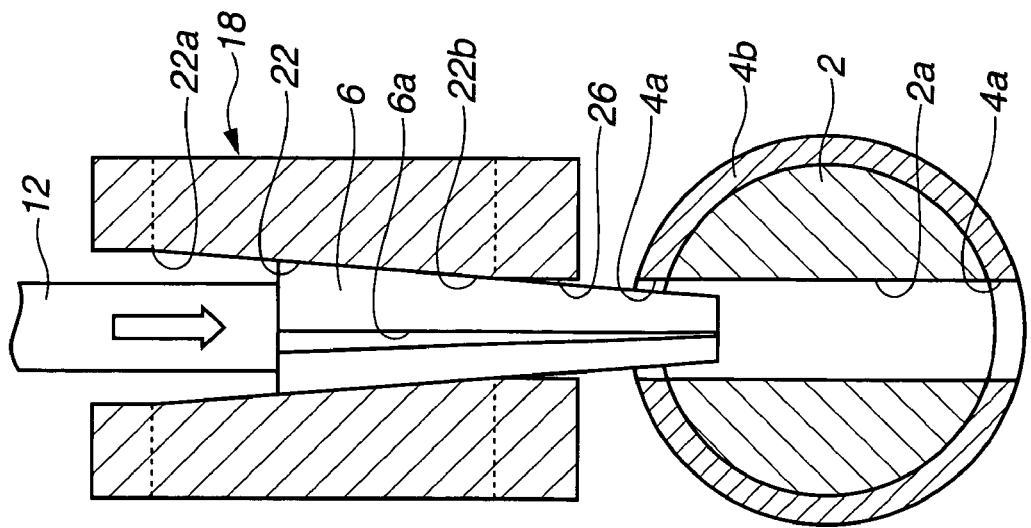

PRESS FITTING TOOL

BACKGROUND OF THE INVENTION

1. Field of the Invention

The present invention relates in general to press fitting tools that press fit a given element or part to an opening formed in a work, more particularly to the press fitting tools of a type that press fits the given element to the opening by practically using a flexibility possessed by the element. More specifically, the present invention relates to a press fitting tool that is suitable for press fitting a spring pin of generally C-shaped cross section to aligned holes of two works to tightly unite the same.

2. Description of the Related Art

Hitherto, various press fitting tools have been proposed and put into a practical use particularly in the automotive parts assembling field.

One of such tools is described in Japanese Laid-open Patent Application (Tokkaihei) 8-71861. The tool of this publication is used for assembling an automotive power transmission and constructed to press fit a spring pin to aligned pin holes, one being a pin hole formed in a shift rod (first work) and the other being a pin hole formed in a boss portion of a shift fork (second work). In operation, the spring pin is fed from a spring pin feeder to a spring pin holder that holds the spring pin, and then, the spring pin holder is turned about its axis to place and position the spring pin accurately on an axis of the aligned pin holes. Then, a press rod is strongly pressed against the spring pin to thrust the same into the aligned pin holes.

In the above-mentioned known tool, the spring pin used is of a type having a generally C-shaped cross section. That is, fitting of the spring pin in the aligned pin holes is effected by a radially expanding return force produced when the same is resiliently compressed in a radially inward direction. In other words, in a free condition wherein no external force is applied to the spring pin, the same has an outer diameter that is larger than a diameter of the aligned pin holes. For processing the press fitting of the spring pin, a leading end of the spring pin is brought into contact with a peripheral edge of an inlet portion of the aligned pin holes and then, with the pressing work of the press rod, pressed into the aligned pin holes while being reduced in diameter.

SUMMARY OF THE INVENTION

However, due to its inherent construction, the above-mentioned known press fitting tool has the following drawback. That is, the inevitable contact of the leading end of the spring pin with the peripheral edge of the open end of the aligned pin holes has a high possibility of producing chips of metal. As is known, if such chips are left in the transmission, abrasion troubles of various parts tend to occur. Furthermore, the contact of the leading end of the spring pin with the peripheral edge of the open end of the aligned pin holes induces a marked abrasion of the leading end of the spring pin, which causes unstable fitting of the pin member in the aligned pin holes. Furthermore, the above-mentioned known tool is complicated in construction.

Accordingly, an object of the present invention is to provide a press fitting tool which is free of the drawbacks that are possessed by the above-mentioned known tool.

According to the present invention, there is provided a press fitting tool that can press fit the spring pin to aligned pin holes of the works without inducing a contact of the leading end of the spring pin with a peripheral edge of the inlet portion of the aligned pin holes.

In accordance with a first aspect of the present invention, there is provided a press fitting tool for press fitting a diametrically and resiliently deformable pin member into aligned holes of works, which comprises a pin diameter reducing device that reduces at least a leading end of the pin member to a given diameter by applying an external force to the pin member, the given diameter being smaller than that of the aligned holes; and an actuating device that thrusts the pin member in a direction to insert the diametrically reduced leading end of the pin member into an inlet portion of the aligned holes without inducing abutment of the diametrically reduced leading end of the pin member with a peripheral edge of the inlet portion of the aligned holes.

In accordance with a second aspect of the present invention, there is provided a press fitting tool for press fitting a diametrically and resiliently deformable pin member into aligned holes of works, which comprises a pin diameter reducing device having a conical bore that presses at least a leading end of the pin member to have a reduced given diameter when the pin member is thrust in the conical bore, the given diameter being smaller than a diameter of the aligned holes of the works; an actuating device that thrusts the pin member in the conical bore with a hydraulic power; and a work holding device that holds and positions the works in such a manner that a common axis of the aligned holes of the works is in alignment with an axis of the conical bore.

BRIEF DESCRIPTION OF THE DRAWINGS

Other objects and advantages of the present invention will become apparent from the following description when taken in conjunction with the accompanying drawings, in which:

FIG. 7A is a schematically illustrated sectional view of an essential part of the press fitting tool of the invention in a condition wherein the spring pin is about to be inserted into the aligned pin holes of the two works; and FIG. 7B is a view similar to FIG. 7A, but showing a condition wherein the spring pin is finally and properly set in the aligned pin holes of the two works.

DETAILED DESCRIPTION OF THE INVENTION

In the following, a press fitting tool 10 of the present invention will be described in detail with reference to the accompanying drawings.

The press fitting tool 10 of the invention is constructed to assemble a parking mechanism that is installed in an automotive transmission. More specifically, the tool 10 is constructed to press fit a spring pin 6 to aligned pin holes, one being a pin hole formed in a manual shaft 2 and the other being a pin hole formed in a manual plate 4.

For ease of understanding, various directional terms, such as upper, lower, right, left, upward and the like, are used in the following description. However, such terms are to be understood with respect to only a drawing or drawings in which the corresponding part or portion is shown.

Before describing the press fitting tool 10 of the present invention, the manual shaft 2 (first work) and the manual plate 4 (second work) that are to be united by the spring pin 6 with the work of the press fitting tool 10 will be described with reference to FIGS. 1, 2A and 2B.

Figure 1:
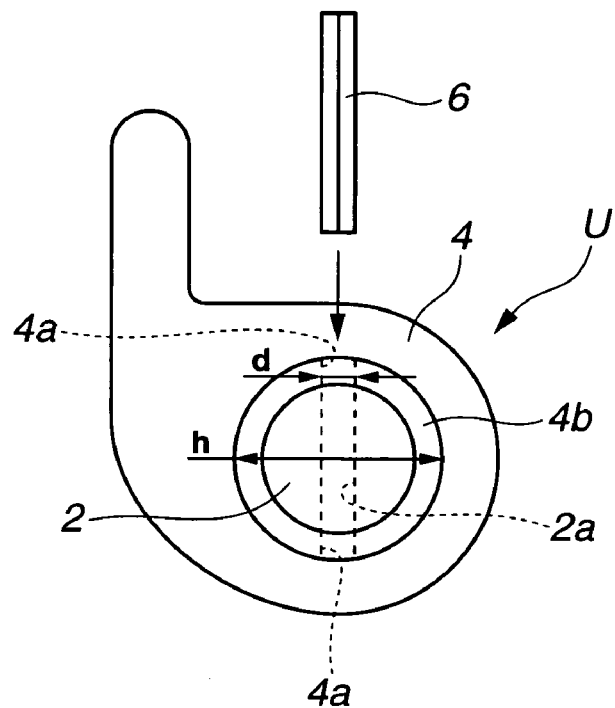
FIG. 1 is a drawing showing a condition wherein a spring pin is about to be press fitted to aligned pin holes of two works (viz., manual shaft and manual plate)

Referring to FIG. 1, there are shown an incomplete unit "U" that includes the manual shaft 2 and the manual plate 4 and, the spring pin 6 that is to be press fitted into aligned pin holes (2*a*, 4*a*) of the incomplete unit "U".

That is, the manual shaft 2 of the incomplete unit "U" is formed with a diametrically extending pin hole 2*a* whose diameter is denoted by reference "d".

The manual plate 4 of the incomplete unit "U" is formed with a cylindrical collar portion 4*b* whose interior defines a cylindrical bore (no numeral). The outer diameter of the collar portion 4*b* is denoted by reference "h". The collar portion 4*b* is formed at diametrically opposed portions with aligned pin holes 4*a*. The diameter of each pin hole 4*a* is equal to that "d" of the pin hole 2*a* of the manual shaft 2.

As shown, before uniting the manual shaft 2 and manual plate 4 by the spring pin 6, the manual shaft 2 is coaxially received in the collar portion 4*b* of the manual plate 4 and angularly positioned in such a manner that the diametrically extending pin hole 2*a* of the manual shaft 2 is aligned with the pin holes 4*a* of the manual plate 4.

The press fitting of the spring pin 6 to the aligned pin holes (4*a*, 2*a*, 4*a*) is carried out by the press fitting tool 10 of the present invention in such a manner as will be described in detail hereinafter. Once the spring pin 6 is properly set in the aligned pin holes (4*a*, 2*a*, 4*a*), the manual shaft 2 and the manual plate 4 are tightly united with an expanding force exhibited by the spring pin 6 to constitute a complete unit.

Figures 2A, 2B:
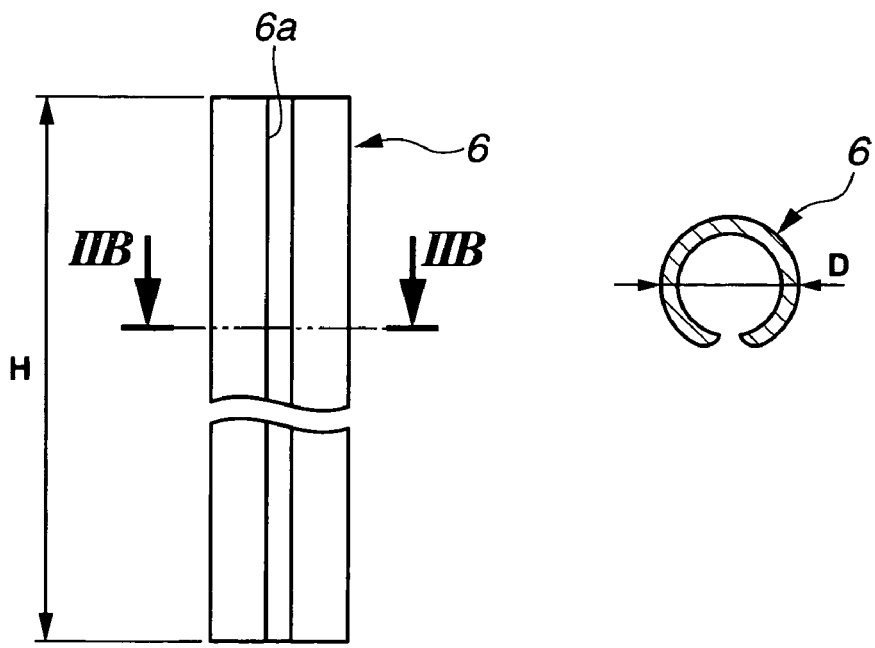
FIG. 2A is an axially sectioned view of the spring pin in a free condition, that is to be treated by a press fitting tool of the present invention.
FIG. 2B is a diametrically sectioned view of the spring pin, that is taken along the line IIB-IIB of FIG. 2A.

Referring to FIGS. 2A and 2B, there is shown in a sectional manner the spring pin 6. As is seen from these drawings, the spring pin 6 is a cylindrical metal member with a slit 6*a* that extends axially, and thus, as is seen from FIG. 2B, the spring pin 6 has a generally C-shaped cross section. The axial length of the spring pin 6 is denoted by reference "H", and the axial length "H" is longer than the outer diameter "h" of the collar portion 4*b* of the manual plate 4.

As is seen from FIG. 2B, the outer diameter of the spring pin 6 in a free condition wherein no external force is applied thereto is denoted by reference "D".

It is to be noted that the outer diameter "D" of the spring pin 6 in the free condition is slightly larger than the diameter "d" of the diametrically extending pin hole 2*a* of the manual shaft 2 and thus slightly larger than the diameter "d" of each pin hole 4*a* of the collar portion 4*b* of the manual plate 4.

Figure 3:
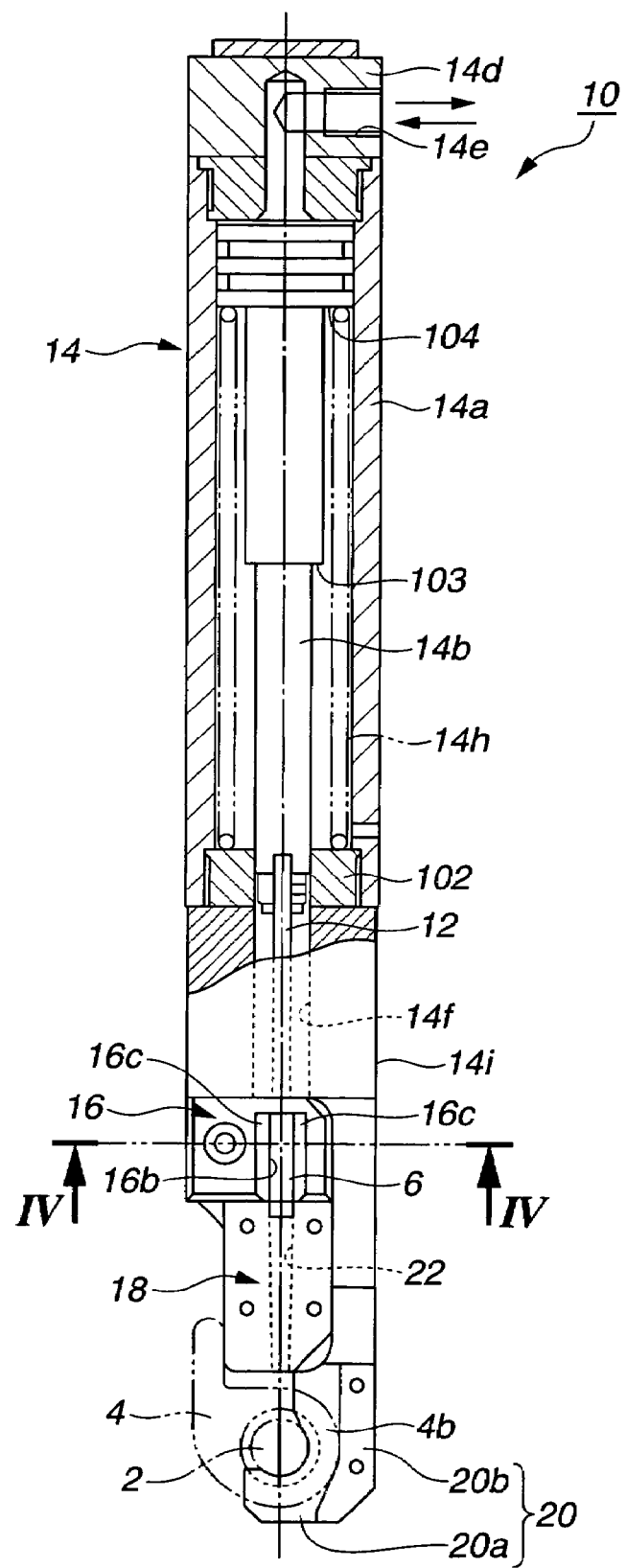
FIG. 3 is an axially sectioned view of the press fitting tool of the present invention.

Referring to FIG. 3, there is shown the press fitting tool 10 according to the present invention, by which the spring pin 6 is press fitted to the aligned pin holes (4*a*, 2*a*, 4*a*) of the manual shaft 2 and manual plate 4 for tightly uniting these two works 2 and 4.

In practical use, the press fitting tool 10 stands in the illustrated manner having the part generally denoted by numeral 20 placed at a lower position and the part generally denoted by numeral 14*d* placed at an upper position.

Thus, in the following, description on the construction of the press fitting tool 10 will be made with respect to such stand condition, and thus with the aid of directional terms such as upper, lower and the like.

As is seen from FIG. 3, the press fitting tool 10 generally comprises a hydraulically actuating device 14 that moves a push rod 12 axially, that is, in a vertical direction, and a loading device 16 and a pin diameter reducing device 18 that are arranged at a lower end portion (or leading end portion) of the hydraulically actuating device 14. The loading device 16 and the pin diameter reducing device 18 are mounted on a pedestal member 14*i* that is secured to the lower end of the hydraulically actuating device 14 through a connecting member 102.

The hydraulically actuating device 14 generally comprises a cylinder 14*a*, a piston 14*b* axially movably received in the cylinder 14*a*, a head cover 14*d* fixed to an upper open end of the cylinder 14*a* to close the same and a coiled return spring 14*h* installed in the cylinder 14*a* to bias the piston 14*b* upward, that is, toward the head cover 14*d*.

The piston 14*b* comprises a larger diameter upper portion defined by upper and lower steps 103 and 104 and a smaller diameter lower portion whose lower end has the push rod 12 coaxially connected thereto.

The head cover 14*d* is formed with an oil inlet/outlet passage 14*e* that is communicated with an interior of the cylinder 14*a*. The coiled return spring 14*h* is compressed between the step 104 and the connecting member 102 to bias the piston 14*b* upward in the drawing.

Although not shown in the drawing, a hydraulic pump or hydraulic pressure source is connected to the oil inlet/outlet passage 14*e* to feed and discharge a certain hydraulic pressure to and from a work chamber of the cylinder 14*a*, that is, the chamber defined in the cylinder 14*a* between the upper end of the piston 14*b* and the head cover 14*d*.

The pedestal member 14*i* is formed with an axially extending bore 14*f* whose upper end is exposed to a lower part of the interior of the cylinder 14*a*. As shown, the bore 14*f* is so sized as to smoothly receive the smaller diameter lower portion of the piston 14*b*. In the illustrated condition, the push rod 12 extending downward from the piston 14*b* is received in the passage 14*f* keeping a sufficient clearance therebetween.

As shown in FIG. 3, the pedestal member 14*i* is provided at a lower end with a work holding device 20 for properly holding and positioning both the manual shaft 2 and manual plate 4.

The work holding device 20 comprises a first holding arm 20*a* that is curved to smoothly and assuredly hold the manual shaft 2 and a second holding arm 20*b* that is shaped to smoothly and assuredly hold the manual plate 4 that is disposed on the manual shaft 2. More specifically, for holding the manual plate 4, the second holding part 20*b* has a curved inner surface to which the cylindrical collar portion 4*b* of the manual plate is to contact. The curved inner surface has a radius of curvature of "h".

Figure 4:
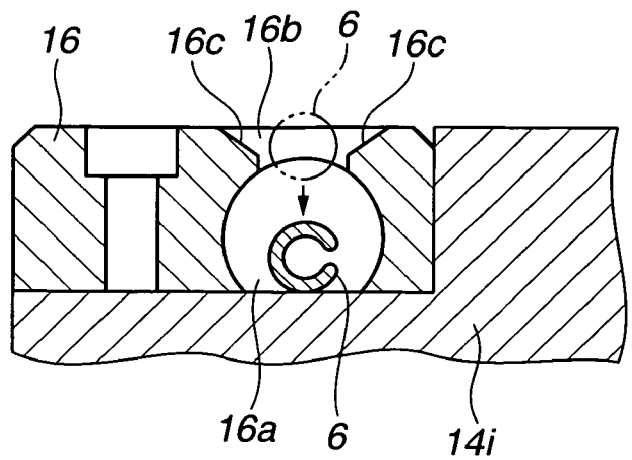
FIG. 4 is an enlarged sectional view taken along the line IV-IV of FIG. 3, showing a loading device installed in the press fitting tool of the invention.

As is seen from FIGS. 3 and 4, the loading device 16 is mounted on and secured to the pedestal member 14*i* through bolts. As is seen from FIG. 4, the loading device 16 is put in a recess formed in the pedestal member 14*i*.

As is understood from FIG. 3, the loading device 16 is positioned above the pin diameter reducing device 18 that has an after-mentioned conical bore 22. As will be described in detail hereinafter, the loading device 16 is constructed to load each spring pin 6 into a given position that faces an inlet part 22*a* of the conical bore 22.

As is seen from FIGS. 3 and 4, the loading device 16 is formed with a cylindrical space 16*a* that is coaxially arranged between the bore 14*f* of the pedestal member 14*i* and the inlet part 22*a* of the conical bore 22. As shown, the cylindrical space 16*a* sufficiently large in size as compared with the spring pin 6.

The loading device 16 is further formed with a loading mouth 16*b* that is communicated with the cylindrical space 16*a* through a narrowed space (see FIG. 4).

The loading mouth 16*b* is rectangular in shape, enclosed by four tapered sides 16*c* and so sized as to permit passage of the spring pin 6 therethrough in a free condition.

As will understood from FIGS. 3 and 4, when the spring pin 6 is put into the loading mouth 16*b*, the same automatically falls down to a given position of the cylindrical space 16*a*. This spring pin loading work is smoothly carried out due to the aid of the four tapered sides 16*c* of the loading mouth 16*b*.

As is seen from FIG. 3, the pin diameter reducing device 18 is bolted to the lower end of the pedestal member 14*i* at a position below the loading device 16. The pin diameter reducing device 18 is formed with a conical bore 22 that is coaxial with the cylindrical space 16*a* of the loading device 16, and thus coaxial with the bore 14*f* of the pedestal member 14*i*.

Figure 5:
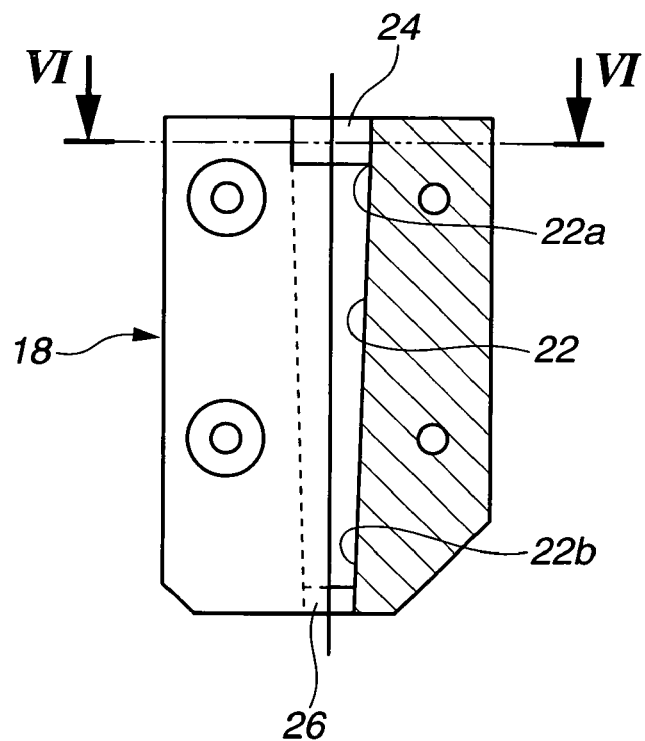
FIG. 5 is an enlarged view of a pin diameter reducing device installed in the press fitting tool of the invention.

As is seen from FIG. 5, the conical bore 22 has a larger inlet part 22*a* whose diameter is smaller than the diameter of the cylindrical space 16*a* of the above-mentioned loading device 16 but larger than the outer diameter "D" of the spring pin 6 in the free condition (see FIG. 2B). The conical bore 22 has a smaller outlet part 22*b* whose diameter is substantially equal to the diameter of the aligned pin holes (4*a*, 2*a*, 4*a*) of the manual shaft 2 and manual plate 4 (see FIG. 1).

Figure 6:
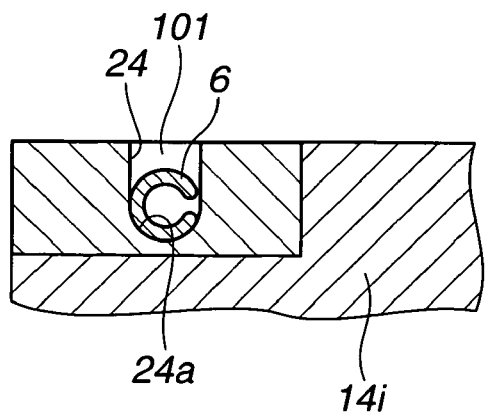
FIG. 6 is a sectional view taken along the line VI-VI of FIG. 5.

As is seen from FIGS. 5 and 6, the inlet part 22*a* of the conical bore 22 of the loading device 18 is formed with a generally U-shaped cut 24 that is mated with a lower end of the loading mouth 16*b* of the loading device 16. The width of the U-shaped cut 24 is equal to that of the loading mouth 16*b*, so that the U-shaped cut 24 can serve as a guide for the spring pin 6. That is, as is seen from FIG. 6, when the spring pin 6 in the free condition is properly loaded onto the given position, a lower (or leading) end of the spring pin 6 is stably set in the U-shaped cut 24 intimately contacting with a concave bottom wall 24*a* of the cut 24. Under this condition, the spring pin 6 is in alignment with the axis of the conical bore 22 of the pin diameter reducing device 18.

As is seen from FIG. 5, the outlet part 22*b* of the conical bore 22 is formed with a right cylindrical straight portion 26. In the illustrated embodiment, the diameter of the straight portion 26 is substantially equal to that of the aligned pin holes (4*a*, 2*a*, 4*a*). However, if desired, the diameter of the straight portion 26 may be slightly smaller than that of the aligned pin holes.

In the following, operation of the press fitting tool 10 of the present invention will be described in detail in the case for press fitting the spring pin 6 into the aligned pin holes (2*a*, 4*a*) of the manual shaft 2 and manual plate 4.

As is described hereinabove, in practical use, the press fitting tool 10 is set to stand upright.

Before starting the operation, the hydraulically actuating device 14 assumes its OFF position, as shown in FIG. 3. Under this condition, the piston 14*b* takes its uppermost rest position.

First, as is seen from FIG. 3, the manual shaft 2 and the manual plate 4, which are temporarily assembled in an automotive transmission (not shown), are properly held by the work holder 20. Under this condition, the two works 2 and 4 are properly positioned so that the pin hole 2*a* of the manual shaft 2 is aligned with the pin holes 4*a* of the manual pate 4, as is seen from FIG. 1. Furthermore, under this condition, the aligned pin holes (4*a*, 2*a*, 4*a*) of the two works 2 and 4 are aligned with the axis of the conical bore 22, as is understood from FIG. 3.

Then, a spring pin 6 is pushed into the cylindrical space 16*a* of the loading device 16 through the loading mouth 16*b*. Upon this, the lower end of the spring pin 6 becomes properly received in the U-shaped cut 24 establishing alignment between the spring pin 6 and the conical bore 22, and thus, instantly the spring pin 6 falls down but slightly in the conical bore 22 and is held at an upper portion of the bore 22.

Then, the hydraulic pump (not shown) is energized to feed the work chamber of the cylinder 14*a* with a compressed oil through the oil inlet/outlet passage 14*e*. With this, the piston 14*b* is moved downward together with the push rod 12 against the force of the return spring 14*h*, and thus, as is seen from FIG. 7A, the leading (or lower) end of the push rod 12 is brought into abutment with the spring pin 6 to push the same downward. The spring pin 6 is thus moved downward in the conical bore 22 while reducing its diameter as is understood from FIG. 7A. During this downward movement, the leading (or lower) end of the spring pin 6 is gradually reduced in diameter and led into the aligned pin holes (4*a*, 2*a*, 4*a*) after having the diameter smaller than that of the aligned pin holes, as shown.

When, as is seen from FIG. 7B, the piston 14*b* (see FIG. 3) and thus the push rod 12 are moved down to their lowermost positions, the spring pin 6 is properly put in the aligned pin holes (4*a*, 2*a*, 4*a*). Upon taking a proper positioning of the spring pin 6 in the aligned pin holes, the spring pin 6 expands radially outward, so that the manual shaft 2 and the manual plate 4 are tightly united by the spring pin 6 with the aid of a repellent force with which the outer cylindrical surface of the spring pin 6 abuts against the inner cylindrical surface of aligned pin holes.

Then, the hydraulic pump is deenergized. Upon this, the piston 14*b* and thus the push rod 12 are moved upward due to the force of the return spring 14*h* returning the oil in the work chamber of the cylinder 14*a* toward the hydraulic pump through the oil inlet/outlet passage 14*e*. When the piston 14*b* is moved up to the uppermost position as shown in FIG. 3, the leading end of the push rod 12 is returned to its stand-by position.

As shown in FIG. 7B, in the proper positioning of the spring pin 6 in the aligned pin holes (4*a*, 2*a*, 4*a*), axial both ends of the spring pin 6 are evenly projected radially outward from the respective pin holes 4*a* of the collar portion 4*b* of the manual plate 4.

As is understood from FIG. 3, when the piston 14*b* is moved downward by a certain distance, the lower step 103 of the same abuts on the connecting member 102 establishing the lowermost position of the piston 14*b*.

As is easily understood from FIG. 7A, when the leading end of the spring pin 6 is about to be inserted into the aligned pin holes (4*a*, 2*a*, 4*a*), the leading end is sufficiently reduced in diameter as compared with the aligned pin holes. This means that the leading end of the spring pin 6 is suppressed from abutting against a peripheral edge of the inlet part of the aligned pin holes, that is, the peripheral edge of the pin hole 4*a* of the manual plate 4. Thus, undesired chips that would be produced when the leading end of the spring pin 6 abuts against the peripheral edge are not produced.

As is understood from FIG. 7A, under movement of the spring pin 6 in the conical bore 22, the spring pin 6 does not contact the cylindrical inner wall of the straight portion 26 of the conical bore 22. This means that the straight portion 26 of the bore 22 is not worn down. Thus, the centering or positioning of the leading end of the spring pin 6 relative to the inlet part of the aligned pin holes (4a, 2a, 4a) is kept unchanged for long time and thus, the above-mentioned advantageous non-abutment press fitting of the spring pin 6 into the aligned pin holes (4a, 2a, 4a) is assured for long time.

The entire contents of Japanese Patent Application 2004-328093 filed Nov. 11, 2004 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A press fitting tool for press fitting a diametrically and resiliently deformable pin member into aligned holes of works, comprising:
 a pin diameter reducing device that diametrically reduces at least a leading end of the pin member to a given diameter by applying an external force to the pin member, the given diameter being smaller than that of the aligned holes; and
 an actuating device that thrusts the pin member in a direction to insert the diametrically reduced leading end of the pin member into an inlet portion of the aligned holes without inducing abutment of the diametrically reduced leading end of the pin member with a peripheral edge of the inlet portion of the aligned holes,
 wherein the pin diameter reducing device comprises a frusto-conical bore with a stationary inner surface through which the pin member is thrust in a longitudinal direction such that an outer diameter of the pin member is reduced, the frusto-conical bore having a diametrically larger inlet portion whose diameter is larger than the outer diameter of the pin member in a free condition and a diametrically smaller outlet portion whose diameter is smaller than that of the diametrically larger inlet portion, and
 wherein the actuating device thrusts the pin member along the longitudinal direction of the frusto-conical bore.

2. A press fitting tool as claimed in claim 1, in which the diametrically smaller outlet portion of the frusto-conical bore is formed with a right cylindrical straight part.

3. A press fitting tool as claimed in claim 1, in which the diametrically larger inlet portion of the frusto-conical bore is formed with a generally U-shaped cut for neatly receiving and guiding the leading end of the pin member in the free condition.

4. A press fitting tool as claimed in claim 1, further comprising a loading device that is arranged at the diametrically larger inlet portion of the frusto-conical bore for loading the pin member onto a given position.

5. A press fitting tool as claimed in claim 4, in which the loading device comprises a cylindrical space that is coaxially mated with the diametrically larger inlet portion of the frusto-conical bore and a loading mouth that is communicated with the cylindrical space through a narrowed space.

6. A press fitting tool as claimed in claim 1, further comprising a work holding device, wherein the work holding device comprises:
 a holding arm arranged at the diametrically smaller outlet portion of the frusto-conical bore to hold and position one of the works; and
 a second arm that is arranged at the diametrically smaller outlet portion of the frusto-conical bore to hold and position another one of the works.

7. A press fitting tool as claimed in claim 1, in which the actuating device comprises:
 a cylinder;
 a piston axially movably received in the cylinder; and
 a push rod coaxially connected to the piston to move therewith, the push rod having a leading end that abuts against a trailing end of the pin member for thrusting the pin member into the frusto-conical bore.

8. A press fitting tool as claimed in claim 1, in which the pin member is a spring pin that has a generally C-shaped cross section.

9. A press fitting tool for press fitting a diametrically and resiliently deformable pin member into aligned holes of works, comprising:
 a pin diameter reducing device having a frusto-conical bore with a stationary inner surface that presses at least a leading end of the pin member to have a reduced given diameter when the pin member is thrusted in the frusto-conical bore along a longitudinal direction, the given diameter being smaller than a diameter of the aligned holes of the works;
 an actuating device that thrusts the pin member in the frusto-conical bore with a hydraulic power, wherein the actuating device thrusts the pin member along the longitudinal direction of the frusto-conical bore; and
 a work holding device that holds and positions the works in such a manner that a common axis of the aligned holes of the works is in alignment with an axis of the frusto-conical bore.

10. A press fitting tool as claimed in claim 9, in which the frusto-conical bore comprises a diametrically larger inlet portion whose diameter is larger than an outer diameter of the pin member in a free condition and the outlet portion of the frusto-conical bore is a diametrically smaller outlet portion whose diameter is smaller than the outer diameter of the pin member in the free condition.

11. A press fitting tool as claimed in claim 10, in which the diametrically smaller outlet portion of the frusto-conical bore has a right cylindrical straight part.

12. A press fitting tool as claimed in claim 9, in which the actuating device comprises:
 a cylinder;
 a piston axially movably received in the cylinder to define a work chamber in the cylinder, the work chamber being communicated with a hydraulic pressure source;
 a spring that biases the piston in a direction to reduce the work chamber; and
 a push rod connected to the piston to move therewith, the push rod having a leading end that abuts against a trailing end of the pin member when operated.

13. A press fitting tool as claimed in claim 9, further comprising a loading device that is arranged between the pin diameter reducing device and the actuating device for loading the pin member to a given position that is in front of the frusto-conical bore.

14. A press fitting tool as claimed in claim 13, further comprising a pedestal member that extends between the actuating device and the work holding device, the pedestal member having the loading device and the pin diameter reducing device mounted thereon.

* * * * *